US008861431B2

(12) United States Patent
Loh et al.

(10) Patent No.: US 8,861,431 B2
(45) Date of Patent: Oct. 14, 2014

(54) APPARATUS AND METHOD FOR MIXED SIGNAL SPREAD SPECTRUM RECEIVING TECHNIQUE

(71) Applicant: Samsung Electronics Co. Ltd., Suwon-si (KR)

(72) Inventors: Lup Meng Loh, Plano, TX (US); Michael L. Brobston, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 92 days.

(21) Appl. No.: 13/739,889

(22) Filed: Jan. 11, 2013

(65) Prior Publication Data

US 2014/0198689 A1    Jul. 17, 2014

(51) Int. Cl.
| | |
|---|---|
| H04B 1/69 | (2011.01) |
| H04B 7/216 | (2006.01) |
| H04L 27/26 | (2006.01) |
| H04J 13/12 | (2011.01) |

(52) U.S. Cl.
CPC .............. *H04B 1/69* (2013.01); *H04L 27/2601* (2013.01); *H04J 13/12* (2013.01)
USPC ......................................................... 370/320

(58) Field of Classification Search
USPC ........... 370/203, 208, 252, 320; 375/130, 140
See application file for complete search history.

(56) References Cited

U.S. PATENT DOCUMENTS

| | | | | |
|---|---|---|---|---|
| 5,995,497 | A * | 11/1999 | Gerakoulis | 370/320 |
| 8,325,632 | B2 * | 12/2012 | Gorbachov | 370/280 |
| 8,553,791 | B1 * | 10/2013 | McCloskey et al. | 375/260 |
| 2008/0051134 | A1 * | 2/2008 | Brobston et al. | 455/553.1 |
| 2012/0188901 | A1 * | 7/2012 | Struhsaker et al. | 370/252 |

* cited by examiner

*Primary Examiner* — Kerri Rose
(74) *Attorney, Agent, or Firm* — Jefferson IP Law, LLP

(57) ABSTRACT

An apparatus and method for mixed signal spread spectrum receiving and spectrum aggregation in a receiver having at least one antenna respectively receiving at least one signal are provided. The method includes modulating the at least one signal received by the receiver with at least one unique orthogonal pseudorandom (PN) code, downconverting the at least one modulated signal into at least one baseband signal, combining the at least baseband signal into an overlaid baseband signal and filtering the overlaid baseband signal, converting the overlaid baseband signal from an analog signal into a digital baseband signal, splitting the digital baseband signal into a plurality of signal paths each having the entirety of the digital baseband signal, applying one of the at least one unique orthogonal PN code to each of the plurality of signal paths, and multiplexing the plurality of signal paths into a combined digital baseband signal.

15 Claims, 4 Drawing Sheets

APPARATUS AND METHOD FOR MIXED SIGNAL SPREAD SPECTRUM RECEIVING TECHNIQUE

BACKGROUND OF THE INVENTION

1. Field of the Invention

The present invention relates to an apparatus and method for mixed signal spread spectrum receiving. More particularly, the present invention relates to an apparatus and method for providing mixed signal spread spectrum receiving using spectrum aggregation.

2. Description of the Related Art

Mobile terminals are used to provide wireless communication services to users. As wireless communication technology has advanced, mobile terminals may provide a variety of functions in addition to simple telephone conversation and/or voice services. For example, mobile terminals may provide functions such as an alarm, a Short Messaging Service (SMS), a Multimedia Message Service (MMS), E-mail, games, remote control of short range communication, Near Field Communication (NFC) and/or other short range communication services, an image and/or video capturing function using a mounted camera, a multimedia function for providing, viewing and/or generating audio and video content, a scheduling function, and many more similar functions and/or functions suitable for being provided on mobile terminals. With the plurality of features provided, mobile terminals are increasingly used by a greater number of users and, concurrently, use a greater amount of bandwidth of wireless communications networks.

In order to accommodate the greater number of users, advances in wireless communication technology maximize spectrum usage according to various techniques, such as spectrum aggregation. Spectrum aggregation allows for simultaneous use of non-contiguous parts of a wireless spectrum from various bands of the wireless spectrum. Spectrum aggregation allows for transmission of a large throughput signal that may not be transmittable using contiguous parts of the wireless spectrum. Another technique for maximizing spectrum usage is to perform higher order modulation so that each transmitted symbol communicates a larger number of bits than a symbol transmitted according to a lower order modulation.

However, in order to provide higher order modulation, a Signal-to-Noise Ratio (SNR) of a wireless channel must be at an appropriate level, i.e., sufficiently high, to support decoding requirements of the higher order modulation. Wireless communications systems using Multi-Input Multi-Output (MIMO) architecture for transmitters, receivers and/or transceivers that use multiple parallel receiver chains may improve an effective SNR of a wireless channel. Use of higher numbers of receivers in the multiple parallel receiver chains allows for larger SNR improvements such that when the wireless channel has a good SNR, the multiple parallel receivers may be used to concatenate bit streams in order to further increase throughput for the transmitted signal. However, when the above discussed technologies are applied to MIMO receivers using the multiple parallel receivers, an amount of silicon used and a package size for receiver chips may increase, and accordingly, an amount of power consumed by the receiver chips may also increase. The increase in power consumption of the receiver chips may cause a decrease in battery life of mobile terminals and, thus, may cause an inconvenience to the user.

In a MIMO architecture having multiple parallel receiver chains, the number of parallel receiver chains may correspond to a number of MIMO inputs/outputs or may correspond to a number of non-contiguous parts of the spectrum that are to be aggregated. In the case of MIMO receivers, each of the receivers should receive the signal and independently process the received signal so as to yield, at a decoder, different content, such as spatial codes and/or data to be concatenated, carried by the signal at respective parts of the signal. In order to perform spectrum aggregation, each part of the spectrum, at various frequency ranges of the spectrum, should be down converted and processed. Because each part of the spectrum should be kept separate, a MIMO receiver that is only analog may down convert to different frequency offsets that are paced adjacent to each other for digital processing.

However, such an implementation of multiple parallel receiver chains for MIMO receivers uses a large amount or size of receiver chips and a large amount of power, and thus, is impractical for MIMO architectures using increasing numbers of MIMO receivers. Additionally, the multiple parallel receiver chain technique may also complicate compensation of characteristics and/or features, such as equalization across bandwidth, absolute gain, In-phase Quadrature (IQ) mismatches, and any other similar characteristics and/or features because each receiver of the multiple parallel receiver chain will have its own Process-Voltage-Temperature (PVT) variation characteristics such that each receiver should be compensated according to its own PVT variation characteristics. Additionally, the multiple parallel receiver chain technique, as described above, produces an additional burden on digital baseband operations due to having to control a large number of analog receivers. Accordingly, there is a need for mixed signal spread spectrum receiving in order to provide a more efficient MIMO receiver and to support higher order modulation in a mobile terminal.

SUMMARY OF THE INVENTION

Aspects of the present invention are to address at least the above-mentioned problems and/or disadvantages and to provide at least the advantages described below. Accordingly, an aspect of the present invention is to provide an apparatus and method for mixed signal spread spectrum receiving.

In accordance with an aspect of the present invention, a method for mixed signal spread spectrum receiving and spectrum aggregation in a receiver having at least one antenna respectively receiving at least one signal is provided. The method includes modulating the at least one signal received by the receiver with at least one unique orthogonal pseudo-random (PN) code, downconverting the at least one modulated signal into at least one baseband signal, combining the at least baseband signal into an overlaid baseband signal and filtering the overlaid baseband signal, converting the overlaid baseband signal from an analog signal into a digital baseband signal, splitting the digital baseband signal into a plurality of signal paths each having the entirety of the digital baseband signal, applying one of the at least one unique orthogonal PN code to each of the plurality of signal paths, and multiplexing the plurality of signal paths into a combined digital baseband signal.

In accordance with another aspect of the present invention, an apparatus for mixed signal spread spectrum receiving and spectrum aggregation in a Frequency Division Duplex (FDD) receiver is provided. The apparatus includes an antenna for receiving a signal, a diplexer for splitting the received signal into at least two signals having respective frequency bands, at least one duplexer for duplexing signal paths of the at least two signals having the respective frequency bands, at least one Low Noise Amplifier (LNA) for amplifying the at least two signals having the respective frequency bands, at least one In-phase Quadrature (IQ) mixer for downconverting respective outputs of the at least one LNA into at least one baseband signal, a plurality of first local oscillators for applying at least one unique orthogonal Pseudorandom (PN) code to each of the at least one baseband signal of signal paths, a signal mixer for combining each of the at least one baseband signal into an overlaid baseband signal, an Analog to Digital Converter (ADC) for converting the overlaid baseband signal into a digital baseband signal, a splitter for splitting the digital baseband signal into a plurality of identical digital baseband signals, a plurality of second local oscillators for applying the at least one unique orthogonal PN code to each of the identical digital baseband signals, at least one Digital Variable Gain Amplifier (DVGA) for amplifying each of the identical digital baseband signals, and a multiplexer for multiplexing each of the identical digital baseband signals into a multiplexed baseband signal.

In accordance with another aspect of the present invention, an apparatus for mixed signal spread spectrum receiving and spectrum aggregation in a Time Division Duplex (TDD) receiver is provided. The apparatus includes a plurality of antennas for receiving a plurality of signals, a plurality of Low Noise Amplifiers (LNAs) for respectively amplifying each of the plurality of signals, a plurality of first local oscillators for applying at least one unique orthogonal Pseudorandom (PN) code to each of the plurality of signals, a second local oscillator for combining each of the plurality of signals into an overlaid signal, an Analog to Digital Converter (ADC) for converting the overlaid signal into a digital overlaid signal, a Digital Down Converter (DDC) for converting the digital overlaid signal into a digital baseband signal and for splitting the digital baseband signal into a plurality of identical digital baseband signals, and a plurality of third local oscillators for applying the at least one unique orthogonal PN code to each of the identical digital baseband signals.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
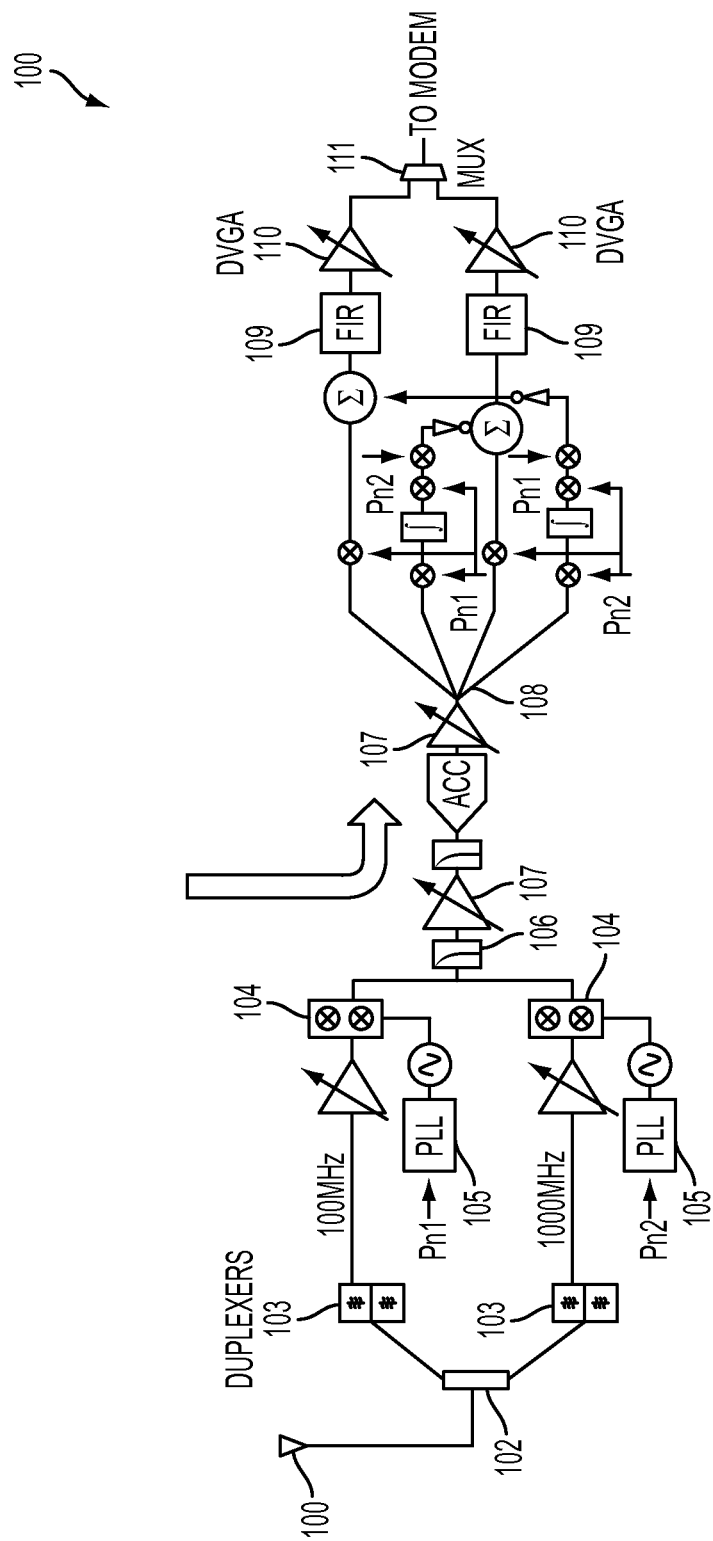
FIG. 1 illustrates a Frequency Division Duplex (FDD) receiver using spectrum aggregation according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention include an apparatus and method for mixed signal spread spectrum receiving. Mixed signal spread spectrum receivers of the present exemplary embodiments, which may also only be referred to as receivers herein, may provide spectrum aggregation and Multi-Input Multi-Output (MIMO) capabilities. Furthermore, the receivers may use orthogonal pseudorandom codes in order to modulate and demodulate each incoming signal, i.e., received signal, such that each received signal has a unique key.

The orthogonal pseudorandom code, which may also be referred to as a pseudo-noise code, may be a spreading code for Code Division Multiple Access (CDMA) networks or other similar and or suitable spread spectrum communication system and may be used to encrypt speech signals. In spread spectrum communication systems, the pseudorandom code is applied to a data signal having a limited bandwidth so as to spread the data signal across a wider bandwidth of the pseudorandom code when transmitting the data signal. The bandwidth of the pseudorandom code may be much bigger than a minimum required bandwidth that should be used for transmission of the data signal. In a spread spectrum system each of a plurality of transmitters may have a unique code in order to distinguish a plurality of data signals respectively transmitted from each of the plurality of transmitters. Accordingly, the transmitted data signals having the pseudorandom code applied thereto may be overlapped and processed using a common channel while still being deterministically separable. In other words, the use of the orthogonal pseudorandom code may be similar to use of common receiver blocks for determining communications channels having downlink signals encoded and transmitted through the common receiver blocks to be subsequently decoded and retrieved according to a digital baseband.

Furthermore, with respect to the use of spectrum aggregation, the mixed signal spread spectrum receivers of the present exemplary embodiments may each include a plurality of Low Noise Amplifier (LNA) inputs, such that each of the plurality the LNA inputs monitors are tuned to a respective band of the spectrum. In the case of a Frequency Division Duplex (FDD) receiver according to an exemplary embodiment of the present invention, a LNA of the FDD receiver may be tuned to and interfaced with a respective duplexer that is designed for a respective band. In contrast, in the case of a Time Division Duplex (TDD) receiver, the plurality of LNAs may interface with Radio Frequency (RF) bandpass filters or may interface directly with antennas of the TDD receiver according to a design of the TDD receiver.

In order to perform spectrum aggregation according to the exemplary embodiments of the present invention, both of the FDD and the TDD type receivers may use a diplexer in order to simultaneously receive signals that are on different and respective frequency bands of the spectrum. In other words, rather than an RF switch that switches an outputting of a signal between two nodes or that combines two signals of respective nodes according to a switching of the RF switch, the diplexer may combine component signals into one signal or split the one signal into component signals according to respective frequency bands of the component signals.

FIG. 1 is a FDD receiver using spectrum aggregation according to an exemplary embodiment of the present invention.

Referring to FIG. 1, a front end of a FDD receiver 100 may include at least one antenna 101 and at least one diplexer 102 connected to the antenna 101. In the case of the FDD receiver 100 having more than one antenna, there may be a respective diplexer 102 connected to each of the antennas. However, exemplary embodiments of the present invention are not limited thereto, and the FDD receiver 100 may include as many antennas and diplexers as may be suitable. The diplexer 102 splits a signal received through the antenna 101 into component signals. For example, in the case of the FDD receiver 100, the signal received through the antenna 101 may be split into two component signals, a first signal being in a 700 Megahertz (MHz) band of the spectrum and a second signal being in a 1900 MHz band of the spectrum.

Next, respective duplexers 103 are disposed along signal paths respectively corresponding to the two component signals. For example, a one duplexer 103 may be disposed along the signal path of the 700 MHz band after the diplexer 102 has split the component signal of the 700 MHz band from the signal received through the antenna 101. Similarly, another duplexer 103 may be disposed along the signal path of the 1900 MHz band. The FDD receiver 100 may also include a plurality of LNAs that are respectively disposed along the signal paths of the 700 MHz band and the 1900 MHz band.

The FDD receiver 100 may further include a plurality of In-phase Quadrature (IQ) mixers 104 to down-convert outputs of the LNAs into the baseband. Each of the IQ mixers 104 may be driven by an independent RF Local Oscillator (LO) 105, and thus, each of the IQ mixers 104 may down-convert respective outputs of the LNAs into the baseband according to a respective independent RF LO 105. According to the present exemplary embodiment, each RF LO 105 may be modulated with a unique orthogonal pseudorandom (PN) code, and the respective output of the IQ mixers 104 is then combined by a mixer 106 in order to produce an overlaid spread spectrum signal of each of the bands, such as the 700 MHz band and the 1900 MHz band, at baseband.

The unique orthogonal PN code may be a sequence of digits that appears to be statistically independent and uniformly distributed. In further detail, a unique orthogonal PN code may be arranged to appear random-like because it appears to be statistically random while being generated according to mathematically determinate rules that produce the unique orthogonal pseudorandom code sequences. Two unique orthogonal PN code sequences may be considered to be orthogonal when an inner product between the two codes is zero. The two unique orthogonal PN code sequences may be orthogonal to each other in a case where the codes are a fixed length or a variable length.

However, it is noted that the signal output from the IQ mixers 104, as well as any close interferers, are modulated with a respective one of the unique orthogonal PN code sequences so as to be converted into a spread spectrum bandwidth at baseband that is anti-alias filtered and converted from an analog signal into a digital signal. In further detail, after the mixer 106 combines the signals of the respective bands, including any of the close interferers, that have been modulated by their respective RF LO 105, the overlaid spread spectrum signal is passed through a low pass filter (not shown), which may also be referred to as an anti-alias filter, and an IQ Analog to Digital Converter (ADC) 107. In the present exemplary embodiment, it may be assumed that any out-of-band blocker signal is sufficiently suppressed by the duplexers 103 and the anti-alias filter.

After the IQ ADC 107 converts the analog signal into a digital signal, the digital signal is split into a plurality of parallel paths by a splitter 108. A number of the parallel paths may be determined according to a number of non-contiguous spectrums that are to be aggregated such that the aggregated spectrum is within a Receiver Digital Baseband (RX DBB). In further detail, each of the non-contiguous spectrums to be aggregated are assigned two digital processing paths, wherein one of the two digital processing paths is for recovering a desired spectrum and related blocker signals, and the other digital processing path is for processing the blocking signals and to have the unique orthogonal PN code sequences applied thereto a second time so as to cancel the prior application of the unique orthogonal PN code sequences.

In further detail, as shown in the exemplary embodiment of FIG. 1, there are four signal paths subsequent after the splitter 108, each path having a different combination of the unique orthogonal PN code sequences applied thereto. For example, in a case where two of the four signal paths are determined to be key paths, then the key paths respectively have one of the RF LO 105 using a unique orthogonal PN code sequence PN1 and the other of the RF LO 105 using a unique orthogonal PN code sequence of PN2. The other two paths, which are not determined to be the key paths and which are optional and may be of any number, each have different combinations of the unique orthogonal PN codes sequences and high pass filter in order to improve the performance of the key paths subsequent to the splitter 108.

As described above, in the key paths, only signals and interferers coded at RF LO 105 with PN1 are recovered in a first path modulated with PN1 because the other signals with orthogonal codes other than PN1 are zeroed out when multiplied with PN1, and similar process of recovering and zeroing out of signals and interferers coded at RF LO 105 with PN2 occurs in the other key path. The other optional two paths, having different combinations of PN1 and PN2 applied thereto, and a high pass filter may be used in order to improve the performance of the key paths by further removing any residue of strong interferers that are coded orthogonally and that may not be sufficiently removed by orthogonal processing. The unique orthogonal PN codes sequences are applied in order to recover signals coded with the identical unique PN code and remove an overlapped noise product that is generated as a result of spreading other signals with the orthogonal code, which are not filtered from the spectrums to which the unique orthogonal PN code sequences are applied, and thus, recovering a desired signal which is the original signal of respective spectrums of 700 MHz and 1900 MHz.

The desired signal is recovered along the four signal paths subsequent to the splitter 108 by multiplying the overlaid spread spectrum signal by one of the unique orthogonal PN code sequences, PN1 and PN2, which are used to modulate the two RF LO 105 shown in FIG. 1. Accordingly, spectrum of one of the 700 MHz band and the 1900 MHz band corresponding to the one of the unique orthogonal PN code sequences, PN1 and PN2, is recovered from the overlaid spread spectrum signal while remaining parts of the overlaid spread spectrum signal are zeroed out as being white noise due to orthogonality. Each of the four signal paths subsequent to the splitter 108 may recover a spectrum from a different band and perform channel filtering because any close interference signals shall also be recovered. However, the present invention is not limited thereto, and there may be any suitable number of RF LO 105, unique orthogonal PN code sequences respective to each of the any number of RF LO 105, and signal paths subsequent to the splitter 108.

The four signal paths are combined into a total of two signal paths respectively corresponding to the 700 MHz band and the 1900 MHz band after the bands have been recovered from the overlaid spread spectrum signal. Furthermore, noise products that result from blocking signals that have been spread by the application of the unique orthogonal PN code sequences are cancelled prior to channel filtering that is performed by Finite Impulse Response (FIR) filters 109. The channel filtered signals may be then amplified by Digital Variable Gain Amplifiers (DVGA) 110 that provide a predetermined signal magnitude of each of the 700 MHz band and the 1900 MHz band in order for modem processing. The filtered and amplified signals corresponding to the 700 MHz band and the 1900 MHz band are time multiplexed by multiplexer (MUX) 111. The time multiplexed signal may then be packetized and provided to a modem.

The system architecture according to the present exemplary embodiment of FIG. 1 may use a common analog baseband receiver for a plurality of signal bands, such as the 700 MHz band and the 1900 MHz band. Because baseband receivers may be made of silicon, they typically consume a large amount of power, and accordingly, a reduced number of baseband receivers provides a more efficient receiver that may be used in a case where a large number of signal bands, i.e., spectrum, is to be aggregated as is the case in higher order MIMO systems.

For example, in the case of receivers for MIMO systems, the receiver may include multiple LNA inputs tuned to a same band in order to achieve diversity for the same signal of the same band to which the multiple LNA inputs are tuned. In a case of a TDD, the multiple LNA inputs may be directly interfaced or connected with a respective one of the multiple antennas of the MIMO system in order to achieve spatial diversity for receiving one signal of one band using the multiple antennas. On the other hand, in a case of FDD, each LNA input may be directly interfaced or connected to a respective duplexer that is directly interfaced or connected to one of the multiple antennas of the MIMO system, as is the case shown in FIG. 1. However, in the case where a User Equipment (UE) does not transmit signals according to a MIMO system, then the LNA inputs may interface only with RF bandpass filters except for a primary LNA that is directly interface or connected to the single antenna of the UE.

Figure 2:
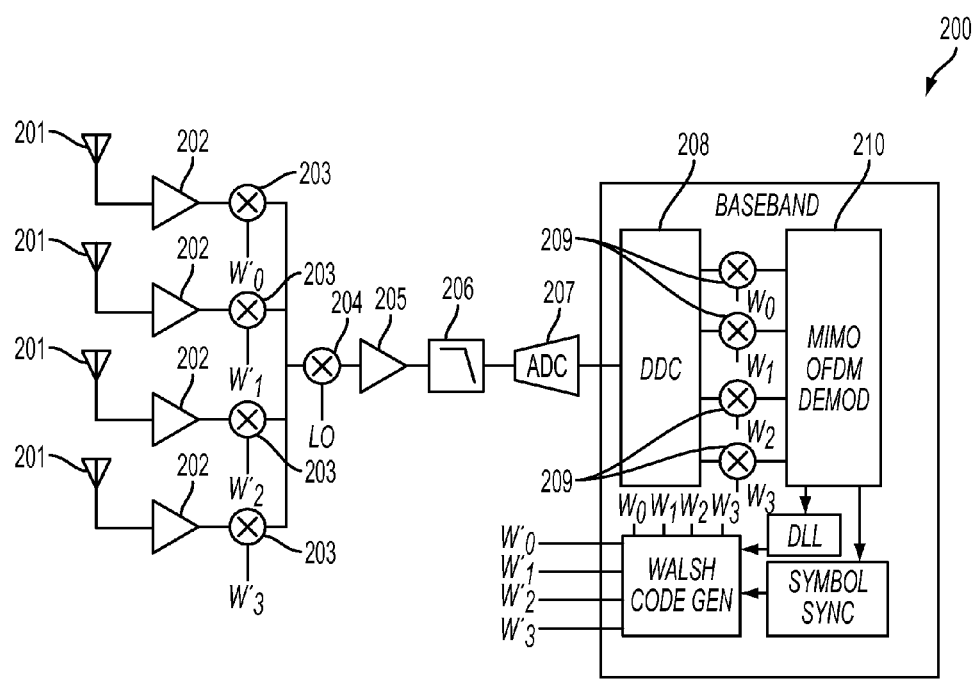
FIG. 2 illustrates a Time Division Duplex (TDD) receiver using spectrum aggregation according to exemplary embodiments of the present invention.

FIG. 2 illustrates is a TDD receiver using spectrum aggregation according to exemplary embodiments of the present invention.

Referring to FIG. 2, a TDD receiver 200 may include a plurality of antennas 201 each having a respective LNA 202 connected thereto. The output of each LNA 202 may be respectively multiplied with a unique orthogonal PN code sequence, which may also be referred to as a Walsh Code in the present exemplary embodiment, at each one of a plurality of multipliers 203. In the present exemplary embodiment of FIG. 2, because each of a plurality of MIMO signal paths that respectively correspond to the plurality of antennas 201 is for the same carrier frequency, the plurality of MIMO signal paths may be combined after the plurality of MIMO signal paths may be combined after respectively passing through the multipliers 203 so as to be collectively downconverted by one single IQ mixer, such as LO 204, in order to generate an overlaid baseband signal that is then amplified by amplifier 205. The overlaid baseband signal is then filtered by an anti-alias filter 206 and then converted to a digital signal by ADC 207.

Once the overlaid baseband signal has been converted into a digital signal by the ADC 207, it is then downconverted into a digital baseband signal by a Digital Downconverter (DDC) 208. As shown in the exemplary embodiment of FIG. 2, the DDC 208 outputs the digital baseband signal along four parallel paths. However, the present invention is not limited thereto, and the DDC 208 may output the digital baseband signal along any suitable number of parallel paths or along one path. Each signal that is output from the DDC 208 along the four signal paths is provided to multiplier 209 so as to be multiplied with a Walsh code that is identical to one of the Walsh codes used by the multipliers 203. Accordingly, a spectrum corresponding to the signals received by the antennas 201 may be recovered from the digital baseband signal by using the Walsh codes identical to those used by the multipliers 203.

Furthermore, other signal spectrum and white noise due to orthogonality may also be recovered. Thus, each of the parallel paths output from the DDC 208 may perform channel filtering on the respective spectrum because close interference signals may also be recovered along with the spectrum corresponding to the signals received by the antennas 201. The filtered spectrums may then be demodulated and processed by a digital modem 210. Thus, in the present exemplary embodiment of FIG. 2, the TDD receiver 200 may include only one ADC 207, and may reduce a need for replicated Intermediate Frequency (IF) analog blocks that each includes a respective ADC. Accordingly, the TDD receiver 200 may be more efficient and consume less power than a receiver having multiple ADC and IF analog blocks. The TDD receiver 200 of the exemplary embodiment of FIG. 2 and the FDD receiver 100 of the exemplary embodiment of FIG. 1 may be implemented in both a UE, such as a terminal, a mobile phone, a portable electronic device, or any other similar and/or suitable UE that operates in a wireless communication system, and a Base Station (BS), or any other similar and/or suitable wireless communication system element such as a repeater or a Relay Station (RS), of a wireless communication system.

Figure 3:
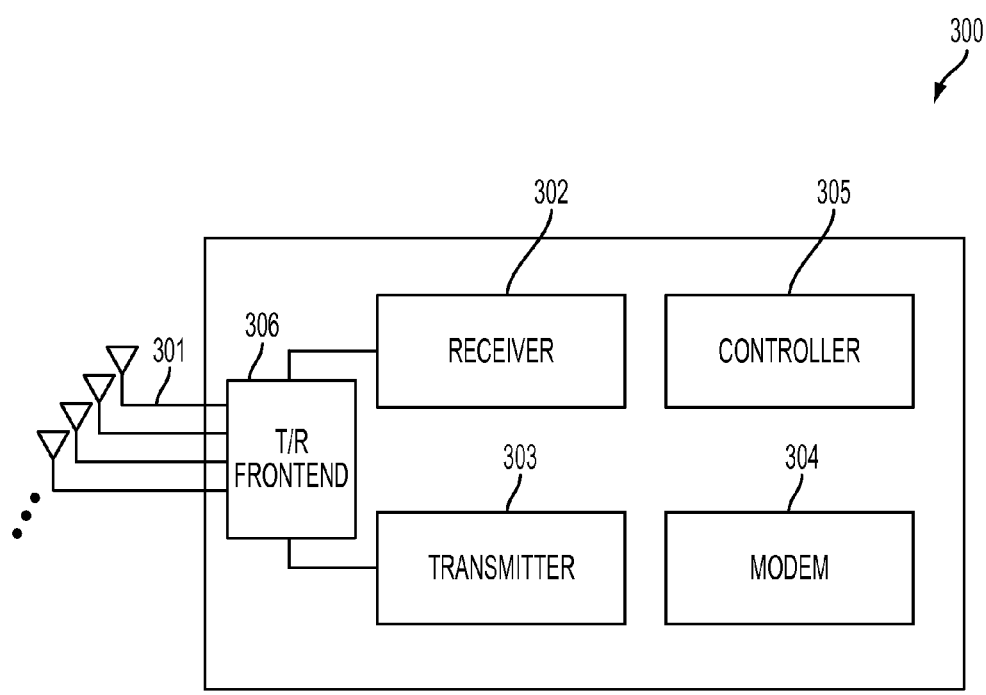
FIG. 3 illustrates a User Equipment (UE) according to exemplary embodiments of the present invention.

FIG. 3 illustrates a UE according to exemplary embodiments of the present invention.

Referring to FIG. 3, a UE 300 may include a plurality of antennas 301 for MIMO wireless communications in a wireless communication system, a receiver 302 for receiving signals in the wireless communication system, a transmitter 303 for transmitting signals in the wireless communication system, a modem 304 for modulating and demodulating the signals received by the receiver 302 and/or the signals transmitted by the transmitter 303, and a controller 305 for controlling overall operations of the UE 300. Furthermore, according to an exemplary embodiment, the receiver 302 and the transmitter 303 may be formed as one unit, such as a transceiver that performs both the transmitting of the signals in the wireless communication system and the receiving of the signals in the wireless communication system. The UE 300 may also include a Transmitter/Receiver (T/R) front end 306 that may be implemented in accordance with the FDD receiver 100 of the exemplary embodiment of FIG. 1 or as the TDD receiver 200 of the exemplary embodiment of FIG. 2, and thus, may include the features described with respect to the FDD receiver 100 and the TDD receiver 200. Furthermore, the UE 300 may include other elements that are common to a portable electronic device, a mobile terminal, and other similar devices. For example, although not shown, the UE 300 may include a display unit, an input unit, a touchscreen device, a microphone, a speaker, a storage unit, and other similar elements used in a portable electronic device and/or a mobile terminal.

Figure 4:
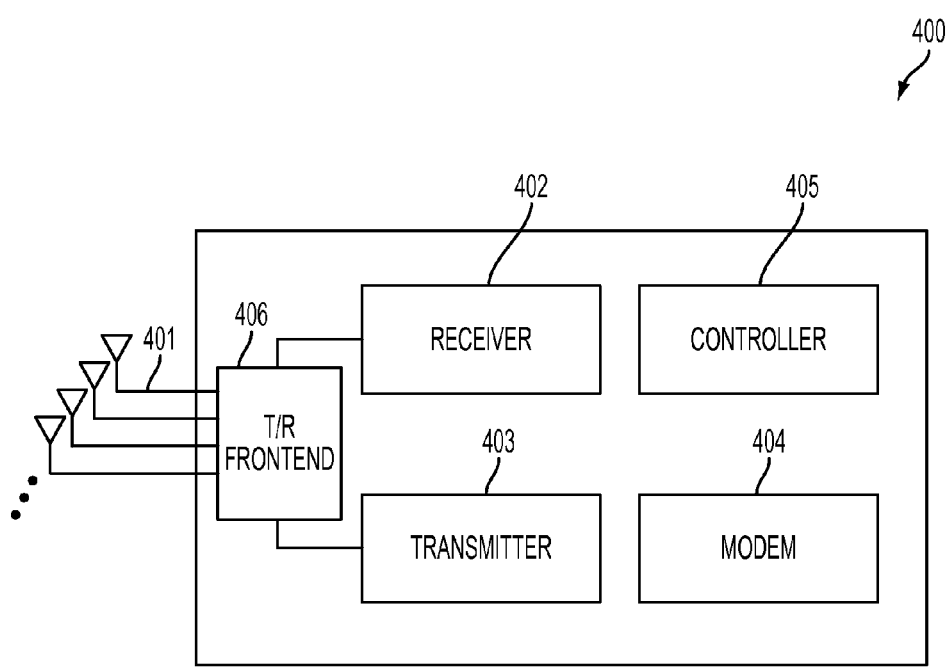
FIG. 4 illustrates Base Station (BS) according to exemplary embodiments of the present invention.

FIG. 4 illustrates BS according to exemplary embodiments of the present invention.

Referring to FIG. 4, a BS 400 may include a plurality of antennas 401 for MIMO wireless communications in a wireless communication system, a receiver 402 for receiving signals in the wireless communication system, a transmitter 403 for transmitting signals in the wireless communication system, a modem 404 for modulating and demodulating the signals received by the receiver 402 and/or the signals transmitted by the transmitter 403, and a controller 405 for controlling overall operations of the BS 400. Furthermore, according to an exemplary embodiment, the receiver 402 and the transmitter 403 may be formed as one unit, such as a transceiver that performs both the transmitting of the signals in the wireless communication system and the receiving of the signals in the wireless communication system. The BS 400 may also include a Transmitter/Receiver (T/R) front end 406 that may be implemented in accordance with the FDD receiver 100 of the exemplary embodiment of FIG. 1 or as the TDD receiver 200 of the exemplary embodiment of FIG. 2, and thus, may include the features described with respect to the FDD receiver 100 and the TDD receiver 200. Furthermore, the BS 400 may include other elements that are common to a BS, or other wireless communication system equipment, such as a repeater and a RS. For example, although not shown, the BS 400 may include additional transmitter and receiver, interface units for wired communication, additional modems, a storage unit, an input unit, and other similar elements used in wireless communication system equipment.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for mixed signal spread spectrum receiving and spectrum aggregation in a receiver having at least one antenna respectively receiving at least one signal, the method comprising:
   modulating the at least one signal received by the receiver with at least one unique orthogonal pseudorandom (PN) code;
   downconverting the at least one modulated signal into at least one baseband signal;
   combining the at least baseband signal into an overlaid baseband signal and filtering the overlaid baseband signal;
   converting the overlaid baseband signal from an analog signal into a digital baseband signal;
   splitting the digital baseband signal into a plurality of signal paths each having the entirety of the digital baseband signal;
   applying one of the at least one unique orthogonal PN code to each of the plurality of signal paths; and
   multiplexing the plurality of signal paths into a combined digital baseband signal.

2. The method of claim 1, wherein each of the at least one unique PN code is different for each of the at least one signal received by the receiver.

3. The method of claim 1, where each of the at least one unique orthogonal PN code applied to each of the plurality of signal paths corresponds to one of the at least one unique orthogonal PN code modulating the at least one signal received by the receiver.

4. The method of claim 1, wherein the receiver is a Frequency Division Duplex (FDD) receiver,
   wherein the at least one signal received by the at least one antenna of the FDD receiver is diplexed so as to split the signal received by the at least one antenna into at least two different signals corresponding to two different frequency bands,
   wherein the at least two different signals corresponding to two different frequency bands are respectively duplexed, and
   wherein the duplexed signals are amplified using a Low Noise Amplifier (LNA) before the modulating of the at least one signal received by the receiver.

5. The method of claim 1, wherein the receiver is a Time Division Duplex (TDD) receiver,
   wherein each of the at least one signal received by each of the at least one antenna of the TDD receiver is amplified using a Low Noise Amplifier (LNA) before the modulating of the at least one signal received by the receiver.

6. The method of claim 5, where the splitting of the digital baseband signal into the plurality of signal paths is performed by a Digital Down Converter (DDC).

7. The method of claim 6, wherein the splitting of the digital baseband signal into the plurality of signal paths is performed before the applying of the at least one unique orthogonal PN code.

8. An apparatus for mixed signal spread spectrum receiving and spectrum aggregation in a Frequency Division Duplex (FDD) receiver, the apparatus comprising:
   an antenna for receiving a signal;
   a diplexer for splitting the received signal into at least two signals having respective frequency bands;
   at least one duplexer for duplexing signal paths of the at least two signals having the respective frequency bands;
   at least one Low Noise Amplifier (LNA) for amplifying the at least two signals having the respective frequency bands;
   at least one In-phase Quadrature (IQ) mixer for downconverting respective outputs of the at least one LNA into at least one baseband signal;
   a plurality of first local oscillators for applying at least one unique orthogonal Pseudorandom (PN) code to each of the at least one baseband signal of signal paths;
   a signal mixer for combining each of the at least one baseband signal into an overlaid baseband signal;
   an Analog to Digital Converter (ADC) for converting the overlaid baseband signal into a digital baseband signal;
   a splitter for splitting the digital baseband signal into a plurality of identical digital baseband signals;

a plurality of second local oscillators for applying the at least one unique orthogonal PN code to each of the identical digital baseband signals;

at least one Digital Variable Gain Amplifier (DVGA) for amplifying each of the identical digital baseband signals; and a multiplexer for multiplexing each of the identical digital baseband signals into a multiplexed baseband signal.

9. The apparatus of claim 8, wherein each of the at least one unique PN code is different for each of the at least one signal received by the receiver.

10. The apparatus of claim 8, where each of the at least one unique orthogonal PN code applied to each of the plurality of signal paths corresponds to one of the at least one unique orthogonal PN code modulating the at least one signal received by the receiver.

11. An apparatus for mixed signal spread spectrum receiving and spectrum aggregation in a Time Division Duplex (TDD) receiver, the apparatus comprising:

a plurality of antennas for receiving a plurality of signals;

a plurality of Low Noise Amplifiers (LNAs) for respectively amplifying each of the plurality of signals;

a plurality of first local oscillators for applying at least one unique orthogonal Pseudorandom (PN) code to each of the plurality of signals;

a second local oscillator for combining each of the plurality of signals into an overlaid signal;

an Analog to Digital Converter (ADC) for converting the overlaid signal into a digital overlaid signal;

a Digital Down Converter (DDC) for converting the digital overlaid signal into a digital baseband signal and for splitting the digital baseband signal into a plurality of identical digital baseband signals; and a plurality of third local oscillators for applying the at least one unique orthogonal PN code to each of the identical digital baseband signals.

12. The apparatus of claim 11, wherein each of the at least one unique PN code is different for each of the at least one signal received by the receiver.

13. The apparatus of claim 11, where each of the at least one unique orthogonal PN code applied to each of the plurality of signal paths corresponds to one of the at least one unique orthogonal PN code modulating the at least one signal received by the receiver.

14. The apparatus of claim 11, wherein each of the plurality of signals received by each of the plurality of antennas is amplified using one of the plurality of LNAs before the applying of the at least one unique orthogonal PN code to each of the plurality of signals.

15. The apparatus of claim 11, wherein the plurality of third local oscillators is included in the DDC.

* * * * *